United States Patent [19]

Landler et al.

[11] Patent Number: 4,478,660

[45] Date of Patent: Oct. 23, 1984

[54] METHOD OF PLACING A DECORATIVE LAYER ON A CARRIER PANEL

[75] Inventors: Josef Landler, Wolfratshausen; Max Mayr, Hart, both of Fed. Rep. of Germany

[73] Assignee: Alkor GmbH Kunststoffverkauf, Munich, Fed. Rep. of Germany

[21] Appl. No.: 124,969

[22] Filed: Feb. 27, 1980

[30] Foreign Application Priority Data

Mar. 15, 1979 [DE] Fed. Rep. of Germany ....... 2910234

[51] Int. Cl.³ .............................................. B32B 5/18
[52] U.S. Cl. ..................................... 156/78; 156/219; 156/222; 156/245; 156/279; 156/307.5; 156/308.2; 156/309.9; 156/322; 264/45.8; 264/46.4; 296/211; 296/214; 428/246; 428/252; 428/308.4; 428/316.6; 428/317.1; 428/319.9
[58] Field of Search ............. 156/62.2, 280, 78, 307.5, 156/219, 307.7, 220, 308.2, 279, 322, 222, 245, 309.9; 428/246, 320, 315, 252; 264/45.8, 46.4; 52/309.8, 794; 296/211, 214; 427/209

[56] References Cited

U.S. PATENT DOCUMENTS 2,113,434  4/1938  Schuhmann ........................ 156/153
3,026,229  3/1962  Wilcox ............................ 156/306.6
3,175,936  3/1965  Squier et al. ..................... 264/45.8
3,269,882  8/1966  Willy ................................. 156/78
3,354,020  11/1967 Copeland ........................... 156/148
3,901,240  8/1975  Holy ................................. 156/78
4,056,646  11/1977 Westfall et al. .................... 428/315
4,157,415  6/1979  Lindenberg ....................... 156/245

FOREIGN PATENT DOCUMENTS 1052632  12/1966  United Kingdom ............... 156/245
1209312  10/1970  United Kingdom ............... 156/219

Primary Examiner—John J. Gallagher
Attorney, Agent, or Firm—Toren, McGeady and Stanger

[57] ABSTRACT

A method for forming a laminate which is composed of a decorative layer and a carrier panel comprising applying a crosslinking plastic foam onto a decorative carrier web, subjecting the thus coated web to heat treatment to dry and partially crosslink the foam and then marrying the unfoamed side of the web to a carrier panel with the application of heat and pressure so as to further crosslink the foam. Laminates in accordance with the invention are described. Such laminates possess stability against delamination as well as relative freedom from gaseous inclusions.

25 Claims, 3 Drawing Figures

METHOD OF PLACING A DECORATIVE LAYER ON A CARRIER PANEL

BACKGROUND OF THE INVENTION

1. Field of the Invention

The invention relates to a method of placing a decorative layer on a carrier panel.

2. Description of the Prior Art

The use of decorative foils on so-called polyolefin/wood dust panels, i.e., stiff panels consisting of a polyolefin binder and a wood dust filler is known. Particularly, polyvinyl chloride foils are used as the decorative foils. The foils are attached to the panel using an adhesion mediator which is initially applied on the polyolefin/wood dust panel and the polyvinyl chloride foil. A laminate is formed by heating the polyolefin/wood dust panel and placing it on the lower part of a press. The polyvinyl chloride foil is placed on the panel with its adhesive layer facing the adhesive layer of the panel. The upper press members are then brought together and lamination of the polyvinyl chloride foil with the polyolefin/wood dust panel is effected. Simultaneously, a three-dimensional deformation of the polyolefin/wood dust panel is carried out.

This method has various disadvantages. The polyvinylchloride foil is not permeable to air and gas so that during the compression molding of the composite of the polyolefin/wood dust panel and the polyvinyl chloride foil, air and gas inclusions frequently occur which negatively affect the appearance of the surface of the finished product. To avoid the air and gas inclusions, the polyvinyl chloride foils have been provided with microperforations, so that gas or air can escape through the foil. However, in many cases, such microperforations are undesirable for aesthetic reasons.

In the preparation of thermoplastic foils, and particularly, polyvinyl chloride foils, the foils are often subjected to stretching orientation and thus stress is locked into the material. As a result, the coating of polyolefin/wood dust panels with thermoplastic foils and particularly, polyvinyl chloride foils, has the additional disadvantage that these latent stresses are released and lead to a separation from the carrier panel. This can happen when the polyvinyl chloride foil is later subjected to the influence of heat during use. A typical example would be heat from the sun's radiation when such coated components are used as lining components inside a motor vehicle. This particular danger also exists if a three-dimensional deformation is performed by compression molding of the polyvinyl chloride foil and the polyolefin/wood dust panel. In this case, the separations begin at those locations in which the polyvinyl chloride foil bears against a concavely curved surface region of the polyolefin/wood dust panel.

SUMMARY OF THE INVENTION

We have discovered a method for producing laminates of carrier panels and modification layers while avoiding or reducing the problems of air and gas inclusions and undesirable separation of the decorative layer from the carrier panel.

More particularly, the present invention comprises the steps of:

(a) applying a layer of a crosslinking plastic foam onto a carrier web;

(b) drying the foam layer with an amount of heat sufficient to partially crosslink the foam layer;

(c) marrying the composite from step (b) to a carrier panel with the web side against the panel by pressing the composite and the panel together with sufficient heat so as to further crosslink the foam.

The completed panel of the present invention is thus a laminate composed of a first layer of a crosslinked plastic foam, a third layer of a carrier panel and a second intermediate layer of a carrier web.

DESCRIPTION OF THE PREFERRED EMBODIMENT

Figure 1:
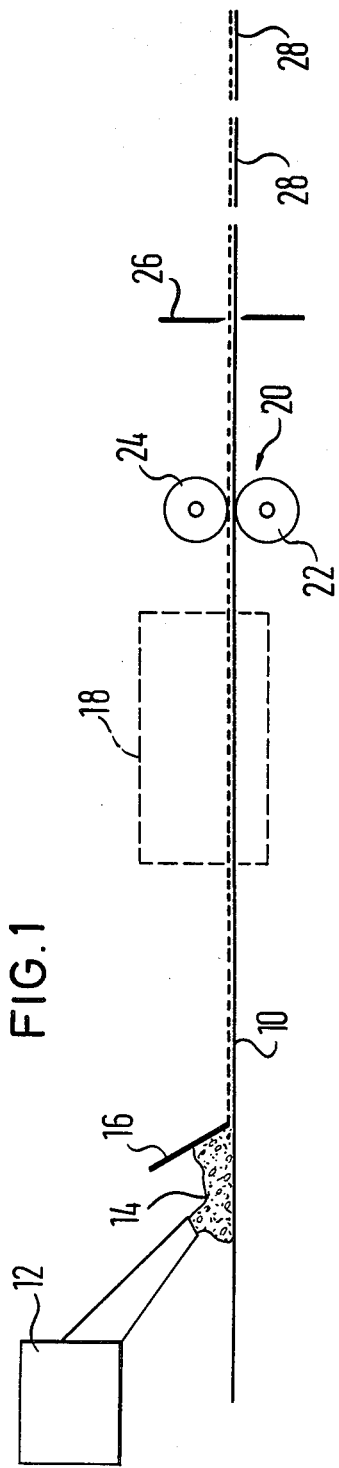
FIG. 1 schematically shows an arrangement for producing a decorative layer for the method according to the invention.

Acrylate foam has been found to be a particularly suitable plastic foam for performing the method of the present invention. This acrylate foam can be dried, crosslinked and combined with the carrier panels at temperatures which are compatible with the foam layer itself and with the carrier panels which are technically and economically feasible.

Such an acrylate foam can be produced by foaming aqueous dispersions of thermally crosslinking polyacrylates. A particularly suitable example of an aqueous dispersion of a polyacrylate is Dicrylan AM produced by Chemische Fabrik Pfersee GmbH, Augsburg, Germany, which is described in the "Rezeptdienst" or formula service of this firm.

Particularly appropriate crosslinking agents for these polyacrylates are ammoniacal agents, for example, ammonia. To this aqueous dispersion conventional thickeners and/or foaming agents and/or foam stabilizers and/or pigments and/or fillers can be added. Also, other resins can be added to the aqueous dispersion, for example, an aqueous dispersion of an ethylene urea/triazine resin.

Because of the simplification of the processing and the stability of the end product, the foaming of the plastics foam is essentially effected by a mechanical treatment. The addition of foam stabilizers ensure that the foam remains a foam during the application onto the decorative carrier web and during the subsequent processing stages until a sufficient crosslinking is obtained.

An important advantage of the method of the present invention resides in that, after tt at high temperatures as can be expected during use from radiation of the sun. Consequently, the above-mentioned phenomena of separation which will occur when carrier panels are coated with polyvinyl chloride webs must not be expected.

To obtain a better marrying of the decorative layer material to the carrier panel and improved three-dimensional deformability of the composite of carrier panel and decorative layer, it is also useful to use a decorative carrier web capable of adapting to surfaces of a higher degree or order, to wit, surfaces which are neither plane or cylindrical or prismatic, but, for example, surfaces with saddle points, or which have a lower elastic restoring force. In such a case, because of the behavior of the decorative carrier web, separation of the layers is less likely even when a strong three-dimensional deformation takes place on surfaces of a higher order.

For better adherence of the plastic foam to the carrier web, it is desirable that a superficial penetration of the foam into the decorative carrier web take place. However, it is not desirable that the plastic foam completely penetrate the decorative carrier web when it is applied. Such complete penetration of the decorative carrier web by the plastic foam would result in significant impairment of the adaptability of the decorative layer to the more complicated spatial surfaces so that difficulties could arise when the decorative layer is later placed on the carrier panel and when the subsequent deformation is carrier out.

In view of the various requirements concerning the adaptability and capability of the foam to adhere to the decorative carrier web, non-woven or bonded webs are particularly suggested for use as the decorative carrier webs. Suitable bonded webs are synthetic bonded fiber webs, for example, polyester spunbonded webs or also polypropylene fiber webs.

The use of polyester spunbonded webs is particularly desirable when high temperature resistance is desired since the polyester spunbonded webs are absolutely stable with respect to their dimensions during subsequent processing and also at the temperatures to be expected during use. Polypropylene fiber webs are also interesting because they are inexpensive. Polypropylene bonded fiber webs can also be readily used when polypropylene-containing polyolefin/wood dust panels are used as the carrier panels. In this case, the chemical affinity of the polypropylene bonded fiber webs for the binder of the polyolefin/wood dust panel can be utilized to obtain the bond between the decorative layer and the carrier panel.

It has been found that, in the production method according to the invention, the bond between the decorative layer and the carrier panel is relatively uncritical and that no separation phenomena within the bonded web serving as the carrier web will generally occur. However, if it is necessary to further improve the bond, a bonded web can be used as the decorative carrier web in which at least a portion of the fibers extend perpendicularly relative to the plane of the web, so that the fiber ends can be anchored in the foam as well as in the carrier panel. Particularly, needle bonded webs can be used as bonded webs in which a portion of the fibers extends perpendicularly relative to the plane of the web.

Suitable carrier panels are particularly those produced with the use of a thermoplastic material as the binder and a filler. An example are panels produced with the use of a polyolefin as the binder and a cellulose material as the filler. Typical representatives of the latter type of panels are carrier panels produced from 50% by weight polypropylene and about 50% by weight wood dust. This is one of the so-called polyolefin/wood dust panels which have been proven suitable in practice.

The decorative carrier web can be combined with the carrier panel by applying an adhesion mediator on the rearside of the decorative carrier web and/or on the decorative side of the carrier panel. An example of such a material a two-component adhesive which can be activated after it has been applied to the respective surface by the temperature used during compression molding. A particular advantage of the method according to the invention is seen in the fact that the decorative carrier web can be combined with the carrier panel by the adhesion between the decorative carrier web and the carrier panel without the use of an adhesion mediator. The reason why it is desirable not to use the adhesive coating is that such a coating must always be applied in the processing plant so that the adhesive can still be activated by the heat during compression molding.

Producers of the decorative layer and the carrier panels want to avoid the need of the processing plant to coat the decorative layer and/or the carrier panel with adhesive since the processing plant is usually not equipped to the same extent as the producer of the initial products with the necessary installations and skilled labor. Another reason to avoid the adhesive coating is that the blanks of the decorative layer material and the carrier panels which are coated with adhesive cannot be stacked without the danger of successive layers sticking together.

The decorative layer and the carrier panel can be combined at an increased temperature by introducing the carrier plate into the press in the heated state. If the carrier plate contains a thermoplastic binder which will combine with the decorative carrier web, the problem of obtaining a bond is solved in the simplest manner.

With the method of the present invention, it is possible to perform a stamping or embossing treatment on the foam surface, i.e., the surface which will be seen and touched, for example, the inside lining parts of rotor vehicles. Thus, in addition to a three-dimensional structure, a fine surface structure, for example, a leather grain-like embossment, can also be obtained.

This embossing treatment can be performed following the first heat treatment of the foam surface, for example, by means of hot embossing rollers. It has been found that the fine structure resulting from the preceding embossing treatment is only insignificantly or not at all influenced by the subsequent compression molding. In a specific case, the necessary drying and crosslinking conditions of the first heat treatment and the later heat treatment in the press can be determined by simple preliminary tests in such a manner that the material is still capable of any further desired embossing after the first heat treatment, but even so, the existing embossment is not once again destroyed in the second heat treatment during compression molding. If embossing has taken place immediately following the first heat treatment, it will be advantageous to use an unheated mold member during the subsequent pressing in order to avoid, as much as possible, any influence of the mold part on the already existing embossment.

However, it is also possible to perform the embossing of the surface to obtain a fine structure only during the compression molding of the carrier panel and the decorative layer. In this case, a hot embossing tool should be used in the press at least on the decorative side. The specific conditions to be used during the first heating and in the later heat treatment during pressing can again be easily determined by simple preliminary tests. Normally, in embossing, an exact impression of the structure and surface of the embossing tool is obtained. With thermoplastic webs, however, an exact impression is not always obtained. This is because elastic restoration forces cannot always be avoided during the embossing of such webs, even at temperatures above the point of plasticity of the web.

Embossing in the press in which the three-dimensional deformation also takes place is a particularly desirable embodiment because the surfaces to be embossed can be made to coincide with certain surface regions of the three-dimensional configuration, for example, quilted seams or pleats or folds can be made to coincide with edges of the three-dimensional deformation.

It has been found that, when the method according to the invention is used, the plastic foam layer remains permeable to air and gas so that air, gas and vapor bubbles are not retained, but can escape through the decorative layer. Of course, the permeability of the decorative layer to gas, air and vapor is dependent upon the surface structure of the foam. If the foam surface is compressed to a significant extent by the embossing pressure and/or by the pressure in the press, the permeability to gas may be reduced. However, a certain permeability to gas should be maintained in most cases. It has also been found that the bonded web which is preferably used as the decorative carrier web facilitates a compensation and escape of gas, vapor and air bubbles.

If the bond of the decorative layer with a carrier panel is not sufficient, it is possible to apply a thermoplastic adhesion mediator layer on the carrier panel, for example, a polypropylene surface coating as the adhesion mediator, on a polyolefin/wood dust panel wherein the polyolefin is polypropylene.

The surface modification can be carried out by methods other than embossing, for example, a flock can be applied on the wet foam layer, for example, by electrostatic flocking.

The product obtained with the method of the present invention has the feel of padding, even after crosslinking because of the foam-like consistency of the decorative layer. This is particularly desirable for the production of lining parts for the inside of automobiles.

It has been found that the foams can be dyed in various ways by adding dyes or pigments to the liquid dispersion.

It has also been found that a large amount of filler can be added to the foam used in accordance with the invention which is desirable for economical reasons. Conventional fillers for plastic foams are suitable for use, e.g., kaolin, talcum, and calcium carbonate. These fillers should be rubbed off or scraped on a roller frame and made into a paste with water before addition to the foam.

In FIG. 1, a decorative carrier web is denoted by 10. Foaming device 12 is arranged above this carrier web from which foam 14 is supplied to decorative carrier web 10. A coating knife 16 spreads the foam on the decorative carrier web 10 in a uniformly thick layer. The carrier web with the foam coated thereon is subjected to a first heat treatment in a heating tunnel 18 where the foam is dried and partially crosslinked. In an embossing station 20 with a bottom roller 22 and an embossing roller 24, a finely structured embossment pattern is embossed into the upper side of the dried and partially crosslinked foam. The decorative layer is then cut into individual blanks 28 in a cutting station 26.

Figure 2:
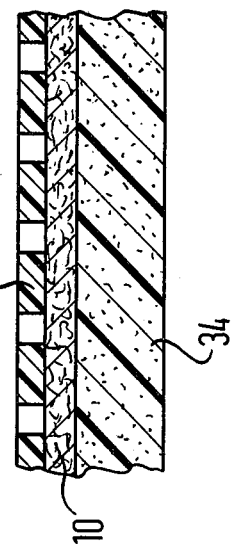
FIG. 2 shows a press for combining a carrier panel with a decorative layer.

FIG. 2 shows a press having a bottom part 30 and a top part 32 of a mold. A blank 34 of a polyolefin/wood dust panel consisting of, for example, 50% polypropylene and 50% wood dust is placed in the bottom part 30. On blank 34 lies a blank decorative layer 28 produced according to the method depicted in FIG. 1 and consisting of carrier web 10 and foam layer 36. The carrier panel 34 is adjusted to a temperature of 180° C. Mold members 30 and 32 are cold or unheated.

Figure 3:
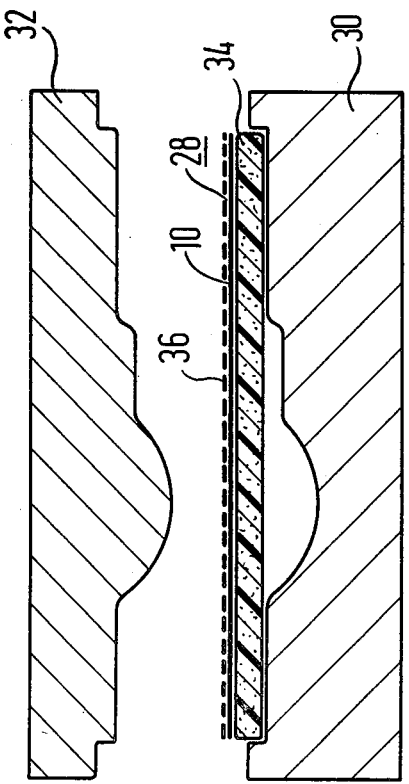
FIG. 3 shows a section taken through a carrier panel which has been provided with a decorative layer by the method according to the invention.

FIG. 3 shows a section of a plane portion of the deformed laminated panel which had been obtained from the press shown in FIG. 2.

The following examples illustrate the present invention. The first examples concern the composition of the coating material, followed by several examples concerning the processing.

Examples illustrating the composition of the coating material:

EXAMPLE 1

100 parts by weight of a 45% aqueous dispersion of a commercially obtainable thermally crosslinking polyacrylate sold under the name "Dicrylan AM" formerly "Dicrylan 3998", produced by Chemische Fabrik Pfersee GmbH, Augsburg, Germany, were put into a mixing vessel with an agitator.

Thereafter, the following materials were successively added to the vessel in the following sequence:

1.2 parts by weight laurylsulfate which is commercially available under the name Dicrylan-Verschäumer 7028 (Dicrylan foaming agent 7028) from Chemische Fabrik Pfersee GmbH, Augsburg, Germany;

2 parts by weight ammonia, thereby adjusting the pH value of the solution to 8;

6 parts by weight of a stearate as a foam stabilizer, commercially available under the name "Dicrylan Stabilisator F" from Chemische Fabrik Pfersee GmbH, Augsburg, Germany;

2 parts by weight of a 30% aqueous polymethacrylate dispersion commercially available under the name "Dicrylan Verdicker R" (Dicrylan thickener R) from Chemische Fabrik Pfersee GmbH, Augsburg, Germany;

3 parts by weight of an ethylene urea/triazine resin commercially available under the name "Knitex CR" from Chemische Fabrik Pfersee GmbH, Augsburg, Germany.

This mixture was agitated without foaming until a homogeneous dispersion was obtained.

EXAMPLE 2

To obtain a black product, 7 parts by weight of Unisperse-Black C-E produced by Ciba-Geigy were stirred into the dispersion obtained according to Example 1.

EXAMPLE 3

To obtain a beige product, a pigment preparation was prepared which contained the following:

5 parts by weight of titanium dioxide,
4 parts by weight water,
0.4 parts by weight Irgasol DAM (agent for dispersing titanium dioxide and other pigments in water),
4 parts by weight Unisperse-Yellow-Oxide M-E,
0.08 parts by weight Unisperse-Black C-E,
0.08 parts by weight Unisperse-Red RN-E (toluidine).

This pigment preparation was added to the mixture produced according to Example 1.

EXAMPLE 4

To a dispersion in accordance with Example 1, 5 parts by weight antimony trioxide and 5 parts by weight Pyrowates 4034 (bromium donor) obtained from the firm Ciba-Geigy were added to make the mixture less flammable.

EXAMPLE 5

To a dispersion produced in accordance with Example 1, 100 parts by weight titanium dioxide were added as filler which, before being added was rubbed off in a roller frame and was made into an aqueous paste.

Examples illustrating further processing:

EXAMPLE 6

The dispersions produced in accordance with Examples 1 through 5 were foamed with the addition of air in a foaming apparatus manufactured by Hansa Werke, Bremen, Lürmann Schütte GmbH & Co., Bremen, Germany. The foam thus obtained has a shaving foam-like consistency. The specific weight is about 200 g/l.

The foams obtained in this manner and discharged from the foaming apparatus were directly supplied to a coating knife device in which they were spread onto a polyester spunbonded web (60 g/m²) in an amount of about 400 g foam per square meter bonded web. During coating, the foam only superficially penetrated into the bonded web.

The web with the foam applied thereon was then dried in a heating duct at an initial temperature of 140° C. During a dwell time of 3 minutes, the temperature is raised in the subsequent heating zones to a final temperature of 160° C. After drying, the foam was no longer sticky, but still very sensitive to pressure and finger impressions did not disappear.

The material dried in this manner was then embossed in an embossing calender with hot rollers having a temperature of about 140° C. It was found that the embossed material could be stored for any length of time.

Blanks of the embossed material were compression molded in a press with cold or unheated mold members with a polyolefin/wood dust panel (wood dust portion about 50%, polypropylene portion about 50%) at a temperature of about 180° C. Using this procedure, the polyolefin/wood dust panel was three-dimensionally deformed, so that the decorative layer also extended over concavely curved surface portions of the polyolefin wood dust panel. The dwell time in the press was 30 to 45 seconds.

After pressing, it was found that the foam became insensitive to pressure and that the grain structure from the preceding embossment had been maintained and could no longer be destroyed by finger pressure. The appearance of the surface was uniformly dull or unpolished. During pressing, no bubbles were formed between the polyolefin/wood dust panel and the decorative layer. This is partially due to the air escaping through the bonded web but also at least partially due to the fact that the foam is permeable to air during pressing.

After a 16 hour storage in 90° C. circulating air, separation of the decorative layer from the polyolefin/wood dust panel was not found, even in the concavely formed surface regions.

EXAMPLE 7

In accordance with an alternative method, the material according to Example 6 after emerging from the heating duct, was initially not embossed and was also capable of storage for any length of time.

Blanks of the non-embossed material were compression molded in a press with a polyolefin/wood dust panel (wood dust portion about 50%, polypropylene portion about 50%) at a temperature of about 180° C., by means of an embossing tool adjusted to a temperature of about 140° C. Using this procedure, the polyolefin/wood dust panel was three-dimensionally deformed to a significant extent, so that the decorative layer extended also over the concavely curved surface regions of the polyolefin wood dust panel. The dwell time in the press was about 60 to 90 seconds. After pressing, it was found that the foam has become insensitive to pressure and a grain structure had been obtained as the impression of the embossing tool. Also, in this case, no bubbles occurred between the polyolefin/wood dust panel and the decorative layer during pressing. The finest profiles of the embossing tool appeared in the grain structure. The press was also especially advantageous because the embossment pattern could be adjusted to the three-dimensional shape, for example, quilted seams and pleats or folds could be placed at the correct location of the three-dimensional shape.

EXAMPLE 8

According to another alternative to the method of Example 6, immediately after spreading on the foam, electrostatic flocking was performed into the still wet foam. In this case, the foam had a specific weight of 500 to 700 g/l and was applied in an amount of about 250 g/m². The foam mixture differed in composition from that of Example 1 in that 8 parts by weight of "Dicrylan Verdicker R" were used.

It was possible to work further effects, for example, an embossment into the flocked wet foam. The flocked web was then hardened in the heating duct during a dwell time of about 5 minutes at temperatures which increased from 140° C. to 170° C. The flock adhesion was satisfactory after heating. Blanks of the flocked material were pressed with polyolefin/wood dust panels as in Example 6. It was found that the flock survived the pressing into a three-dimensional molded part without damage.

What is claimed is:

1. A method for forming a three-dimensional laminate comprising:
   (a) applying a layer of a crosslinkable plastic foam onto a sheet of fibrous material, so that the foam permeates partially into the surface of the sheet of fibrous material and a layer of foam remains on the sheet;
   (b) drying the foam;
   (c) heating a carrier panel sheet containing a thermoplastic binder to plastify the binder;
   (d) marrying the heated carrier panel sheet to the non-foam coated side of the fibrous sheet; and
   (e) pressing the married layers from step (d) between two three-dimensionally shaped opposing pressing members to form the desired shaped laminate and to at least partially crosslink the foam as a result of the heat from the preheated carrier panel and embed fibers of said fibrous material into the binder of the carrier panel.

2. The method of claim 1 wherein said foam layer is partially crosslinked before said marrying step.

3. The method of claim 1 wherein an acrylate foam is used.

4. The method of claim 3 wherein said acrylate foam is prepared by foaming an aqueous dispersion of a thermally crosslinking polyacrylate.

5. The method of claim 4 wherein an ammoniacal crosslinking agent is added to the aqueous dispersion of said polyacrylate.

6. The method of claim 4 or 5 wherein thickeners, foaming agents, foam stabilizers, pigments, or fillers are added to the aqueous dispersion of the thermally crosslinking polyacrylate.

7. The method of claim 4 or 5 wherein an ethylene urea triazine resin is added to the aqueous dispersion.

8. The method of claim 1, 3, 4 or 5 wherein the foaming of the plastic foam is effected by mechanical treatment.

9. The method of claim 1, 3, 4, or 5 wherein the fibrous material is a bonded web.

10. The method of claim 1, 3, 4, or 5 wherein the fibrous material is a synthetic bonded fiber web.

11. The method of claim 1, 3, 4, or 5 wherein the fibrous material is a polyester spunbonded web.

12. The method of claim 1, 3, 4, or 5 wherein the fibrous material is a polypropylene bonded fiber web.

13. The method of claim 1, 3, 4, or 5 wherein the fibrous material is a bonded web in which at least a portion of the fibers extend perpendicularly relative to the plane of the web.

14. The method of claim 1, 3, 4, or 5 wherein the fibrous material is a needle bonded web in which at least a portion of the fibers extend perpendicularly relative to the plane of the web.

15. The method of claim 1, 3, 4, or 5 wherein the carrier panel is composed of a thermoplastic material as the binder and a filler.

16. The method of claim 1, 3, 4, or 5 wherein the carrier panel contains a polyolefin as the binder and a cellulose material as the filler.

17. The method of claim 1, 3, 4 or 5 wherein the carrier panel is a polyolefin/wood dust panel.

18. The method of claim 1, 3, 4, or 5 wherein the carrier panel is a polypropylene/wood dust panel containing about 50% by weight polypropylene and about 50% by weight wood dust.

19. The method of claim 1, 3, 4, or 5 wherein an adhesion mediator of a thermoplastic material is applied to the side of the panel which contacts the fibrous material in step (c).

20. The method of claim 1, 3, 4 or 5 wherein the foamed surface is embossed during the pressing step.

21. The method of claim 1, 3, 4, or 5 wherein the foamed surface is embossed after step (b) and before step (d) by means of a hot embossing roller.

22. The method of claim 1, 3, 4, or 5 wherein unheated pressing members are used in step (e).

23. The method of claim 1, 3, 4, or 5 wherein the surface of the foam is embossed during the pressing.

24. The method of claim 1, 3, 4, or 5 wherein at least the foamed side is embossed during the pressing operation using a hot embossing tool.

25. The method of claim 1, 2, 3, or 4 wherein a flock is applied to the foamed side of the composite prior to step (c).

* * * * *